(12) United States Patent
Jackson

(10) Patent No.: US 11,710,125 B1
(45) Date of Patent: Jul. 25, 2023

(54) SYSTEMS AND METHODS FOR AUTOMATED VALIDATION FOR PROPRIETARY SECURITY IMPLEMENTATIONS

(71) Applicant: Worldpay, LLC, Symmes Township, OH (US)

(72) Inventor: Amie Jackson, Denver, CO (US)

(73) Assignee: Worldpay, LLC, Symmes Township, OH (US)

( * ) Notice: Subject to any disclaimer, the term of this patent is extended or adjusted under 35 U.S.C. 154(b) by 498 days.

(21) Appl. No.: 15/925,161

(22) Filed: Mar. 19, 2018

(51) Int. Cl.
*G06Q 20/40* (2012.01)
*G06Q 30/02* (2023.01)
*G06Q 30/0203* (2023.01)

(52) U.S. Cl.
CPC ......... *G06Q 20/4012* (2013.01); *G06Q 20/401* (2013.01); *G06Q 30/0203* (2013.01)

(58) Field of Classification Search
CPC .......... G06Q 20/4012; G06Q 20/401; G06Q 30/0203
See application file for complete search history.

(56) References Cited

U.S. PATENT DOCUMENTS 8,296,244 B1* 10/2012 Heroux ................. G06Q 40/00 705/317
2007/0157316 A1* 7/2007 Devereux et al. . H04L 63/0227 726/24
2008/0147548 A1* 6/2008 Jiang ..................... G06Q 20/12 705/44
2011/0126189 A1* 5/2011 Galvin et al. ........ G06F 9/44547 717/174
2013/0073844 A1* 3/2013 Shimada ................ H04L 63/08 713/156
2014/0337969 A1* 11/2014 Li et al. .................. G06F 21/81 726/19
2017/0251013 A1* 8/2017 Kirti et al. ........... H04L 63/1441
2018/0053157 A1* 2/2018 Roffey ............. G06K 19/06206

* cited by examiner

*Primary Examiner* — Jacob C. Coppola
*Assistant Examiner* — Terry Nathan Murray
(74) *Attorney, Agent, or Firm* — Bookoff McAndrews, PLLC

(57) ABSTRACT

Systems and methods are disclosed for automated validation for proprietary security implementations. One method includes: receiving, from each of a plurality of merchants, a list of security service providers used by the merchant; enabling connection with the each of the security service providers of the received list of security service providers used by the merchant; receiving, from each of the listed security service provider with connection enabled, security service information as it pertains to the merchant of the plurality of merchants; generating a security service profile for each merchant of the plurality of merchants, based on the received security service information from each security service provider of the received list of security service providers of the merchant; and outputting the security service profile of the merchant of the plurality of merchants to an electronic storage medium.

16 Claims, 4 Drawing Sheets

300A 302 304

| REPOSITORY | | |
|---|---|---|
| MERCHANT 41238 | S.S.P.<br>S.S.P.<br>S.S.P. | TRUST WAVE<br>ABC<br>XYZ |
| MERCHANT 32185 | S.S.P.<br>S.S.P.<br>S.S.P. | SECURITY METRIX<br>XYZ<br>TRUST WAVE |

| REPOSITORY | | |
|---|---|---|
| S.S.P. TRUST WAVE | PRODUCT<br>PRODUCT<br>PRODUCT<br>PRODUCT | WEB APP. FIRE WALL<br>SOC ENABLEMENT<br>SIEM ENTERPRISE<br>WEB CONTENT<br>MONITORING |
| S.S.P. SECURITY METRIX | PRODUCT | PCI COMPLIANCE<br>PORTAL ACCESS<br>ONLINE AND PHONE<br>SCOPING PAN SCAN |
| S.S.P. ABC | PRODUCT<br>PRODUCT | 123A<br>456B |
| S.S.P. XYZ | PRODUCT | 789C<br>975D |

*FIG. 3B*

SYSTEMS AND METHODS FOR AUTOMATED VALIDATION FOR PROPRIETARY SECURITY IMPLEMENTATIONS

FIELD OF DISCLOSURE

The present disclosure relates generally to the field of payment transactions and, more particularly, to automated validation for proprietary security implementations.

BACKGROUND

The payment cards industry (PCI) often faces a unique challenge of safeguarding the privacy of vital information (e.g., primary account numbers, biometric data, etc.) of the general public, vis-à-vis cardholders. A security breach and subsequent compromise of payment card data has far-reaching consequences for affected organizations, including: regulatory notification requirements, loss of reputation, loss of customers, potential financial liabilities (for example, regulatory and other fees and fines), and potential litigation.

Authorities and sources for security standards in the payment cards industry (e.g., the Payment Cards Industry Data Security Standard (PCI DSS)) and supporting documents represent a common set of industry tools that may help ensure the safe handling of cardholder data. The standards itself may provide an actionable framework for developing a robust security process—including preventing, detecting, and reacting to security incidents. To reduce the risk of compromise and mitigate the impact if it does occur, it is important for entities that store, process, or transmit cardholder data to be compliant. One way that authorities and sources for standards in the payment cards industry encourage compliance is through reports, questionnaires, and assessments that they request merchants, acquirers, and security service providers to complete. Within the PCI DSS and supporting documents, the PCI DSS self-assessment questionnaires (SAQs) may be validation tools that may assist merchants and service providers in self-evaluating their compliance with the PCI DSS, and in reporting the results of their PCI DSS self-assessment. Another validation tool provided by the PCI DSS may be the Report on Compliance (ROC).

Therefore, there is a desire for systems and methods that encourage merchants, acquirers, and/or financial institutions to comply with data security standards like the PCI DSS, and to take their assessment tools like the SAQ for validation. Nevertheless, the SAQ is lengthy and burdensome for merchants to complete, as they may have many different vendors providing data security services helping merchants to achieve PCI compliance and handle one or more of the requirements. Additionally, it is difficult for vendors (e.g., approved scanning vendors (ASVs), Trustwave, etc.) to customize or present relevant requirements for a merchant based on the merchant's data security technology that the merchant currently has in place. Furthermore, as merchants switch acquirers, stored security information may be lost. Therefore, there is a desire for a system and method that may provide automated validation for proprietary security implementations.

SUMMARY

According to certain aspects of the present disclosure, systems and methods are disclosed for automated validation for proprietary security implementations.

In one embodiment, a computer-implemented method is disclosed for automated validation for proprietary security implementations. The method comprises: receiving, from each of a plurality of merchants, a list of security service providers used by the merchant; enabling connection with the each of the security service providers of the received list of security service providers used by the merchant; receiving, from each of the listed security service provider with connection enabled, security service information as it pertains to the merchant of the plurality of merchants; generating a security service profile for each merchant of the plurality of merchants, based on the received security service information from each security service provider of the received list of security service providers of the merchant; and outputting the security service profile of the merchant of the plurality of merchants to an electronic storage medium.

In accordance with another embodiment, a system is disclosed for automated validation for proprietary security implementations. The system comprises: a data storage device storing instructions for automated validation for proprietary security implementations; and a processor configured for: receiving, from each of a plurality of merchants, a list of security service providers used by the merchant; enabling connection with the each of the security service providers of the received list of security service providers used by the merchant; receiving, from each of the listed security service provider with connection enabled, security service information as it pertains to the merchant of the plurality of merchants; generating a security service profile for each merchant of the plurality of merchants, based on the received security service information from each security service provider of the received list of security service providers of the merchant; and outputting the security service profile of the merchant of the plurality of merchants to an electronic storage medium.

In accordance with another embodiment, a non-transitory machine-readable medium is disclosed that stores instructions that, when executed by a processor, causes the processor to perform a method for automated validation for proprietary security implementations. The method may include: receiving, from each of a plurality of merchants, a list of security service providers used by the merchant; enabling connection with the each of the security service providers of the received list of security service providers used by the merchant; receiving, from each of the listed security service provider with connection enabled, security service information as it pertains to the merchant of the plurality of merchants; generating a security service profile for each merchant of the plurality of merchants, based on the received security service information from each security service provider of the received list of security service providers of the merchant; and outputting the security service profile of the merchant of the plurality of merchants to an electronic storage medium.

Additional objects and advantages of the disclosed embodiments will be set forth in part in the description that follows, and in part will be apparent from the description, or may be learned by practice of the disclosed embodiments. The objects and advantages on the disclosed embodiments will be realized and attained by means of the elements and combinations particularly pointed out in the appended claims.

It is to be understood that both the foregoing general description and the following detailed description are exemplary and explanatory only and are not restrictive of the detailed embodiments, as claimed.

BRIEF DESCRIPTION OF THE DRAWINGS

FIGS. 3A and 3B depict exemplary merchant and security service provider (SSP) engines, respectively, of the security validation server, in accordance with non-limiting embodiments.

DETAILED DESCRIPTION

Figure 1:
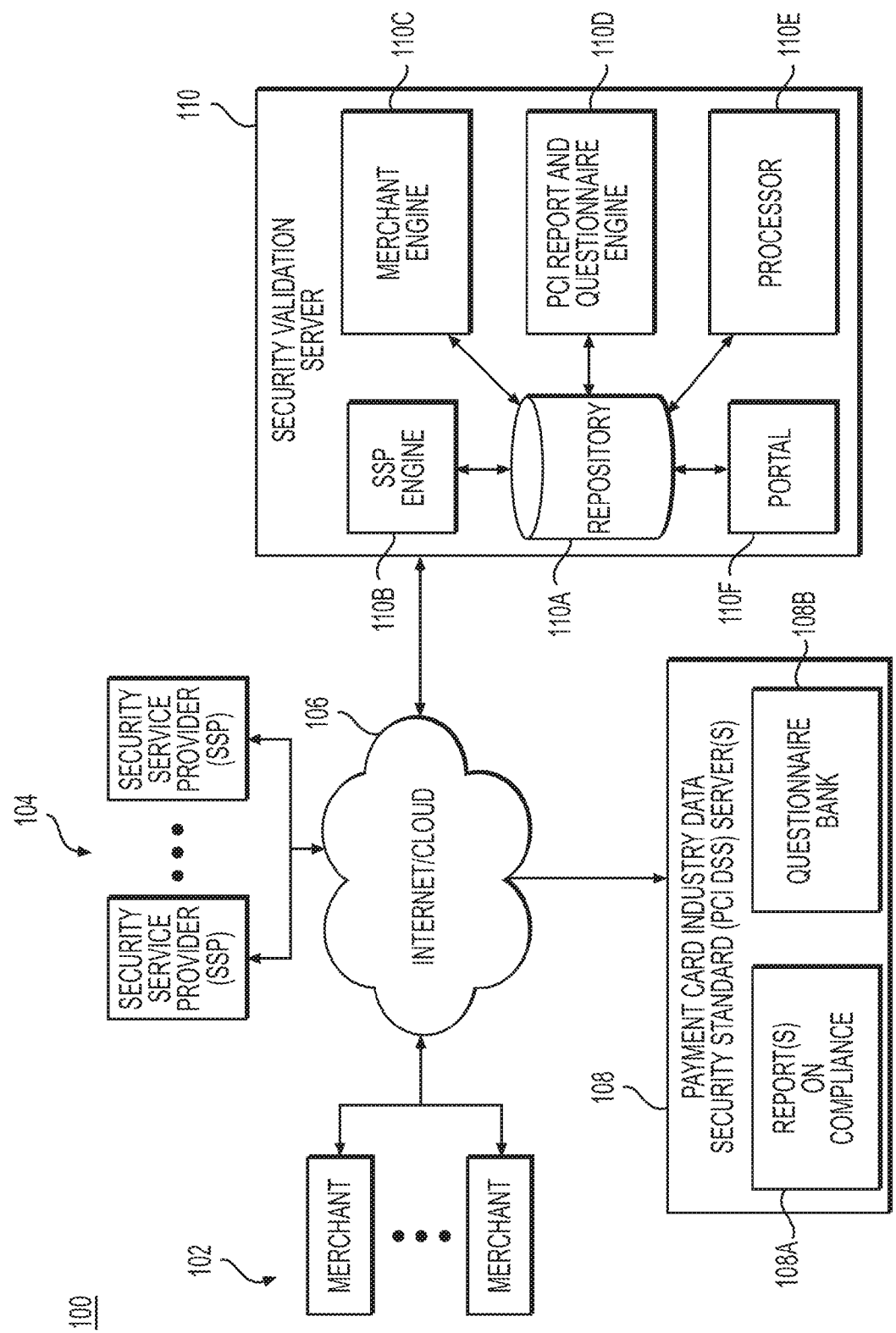
FIG. 1 depicts a block diagram of an example environment for automated validation for proprietary security implementations, in accordance with non-limiting embodiments.

Various non-limiting embodiments of the present disclosure will now be described to provide an overall understanding of the principles of the structure, function, and use of systems and methods disclosed herein for automated validation for proprietary security implementations.

As described above, there is a need for encouraging merchants and/or acquirers to validate that their security standards comply with the PCI DSS. One of the ways merchants and/or acquirers validate their security systems is through the self assessment questionnaires ("SAQ(s)" or "questionnaires") and reports on compliance ("ROC(s)" or "reports") offered by the PCI DSS. However, these reports and questionnaires are lengthy and burdensome to complete, as merchants and/or acquirers have many different vendors providing security services. These vendors may be security service providers (SSPs), including but not limited to, e.g., TrustWave, Trust IP, Security Metrix, etc. Some SSPs may walk customers through SAQs, e.g., via online portals, and may pre-fill questions if it is approved by an acquirer. However, merchants may use several different SSPs, and information pertaining to the security systems and practices ("security implementation information" or "security implementation data") of the merchants may be lost when a merchant switches acquirers.

Various embodiments of the present disclosure may describe a validation system that may be independent of the type of acquirer or SSPs used by the merchant. In some embodiments, the security implementation data may be centralized and/or stored in a computing system or server so that a concerned third party (e.g., which has access to the computing system or server) may know whether a merchant is using any of these technologies. In some embodiments, the computing system or server may then pre-fill any questionnaires or reports requested by the PCI DSS based on security implementation data of a merchant. Alternatively or additionally, the computing system or server may tell a merchant, acquirer, or a relevant third party (e.g., TrustWave) that they do not need to answer certain questions of the requested questionnaire or report.

Thus, various embodiments of the present disclosure may greatly benefit the payment cards industry by reducing the scope of labor and data gathering for a large number of merchants, and facilitate a better and more efficient communication of the security implementation data of a large variety of merchants, to better assist with cybersecurity concerns, and to better develop any relevant technology.

The centralized computing system or server (e.g., "security validation server," or "security validation system") may include a portal that can facilitate the retrieval of information from and communication with various security service providers (SSPs), merchants, and/or acquirers. Furthermore, the portal may be used to retrieve information regarding PCI DSS and other security standards, e.g., from a computing system or server involved with PCI DSS. Some embodiments for validation for security implementation may include vetting the different SSPs to see what products, tools, or services that they offer for security implementation. For example, the security validation server may query an SSP for whether it has PCI validation, whether a specific tool, service or product is on a list, etc. A specific tool, service, or product may include, for example a managed security service provider providing managed firewalls, a webhosting company (e.g., Order Talk, Amazon Web Services, etc.) providing outsourced online payment processing for companies who take online ordering, a value added reseller (VAR) that may install and configure the POS, etc. For example, the VAR may remove default passwords and/or certify as a qualified integrator and reseller (QIR). Other examples of specific tools, services, or products may include Anti-Virus and/or remote access companies (e.g., McAfee, LogMeIn, etc.). Both of these providers may provide solutions to help their users meet PCI requirements.

Since some merchants (e.g., small and medium sized businesses) may lose security implementation data when they switch acquirers, it is contemplated that the centralized security validation server or computing system may be a third-party hosted platform, in some embodiments. Furthermore, a firewall service may be used for the pre-filling up of questionnaires and reports, e.g., by receiving information on the questions that still need information or by determining the questions that are answered or for which information has already been received. Thus, various embodiments of the present disclosure may allow a merchant to merely indicate the SSPs that they subscribe to or use, and/or what services, tools, or products offered by the SSPs are currently being used, instead of answering tougher questions asked in the questionnaires or reports. This may add a layer of agnosticism between the security validation server (e.g., via the portal) and the merchants. Rather than having a merchant's acquirer or its ASV company create customized merchant SAQs based on a proprietary technology (e.g., P2PE), and/ or have external SSPs handle other requirements (e.g., managed firewalls), an agnostic solution would not be specific to the merchant, merchant group, acquirer, ASV, and/or franchise. Thus, the agnostic approach may provide PCI simplification for a multitude of merchants using any acquirer or any SSPs. In such embodiments, acquirers or ASVs need not have to create customize SAQs for each merchant or each time a merchant switches to a new provider.

It is also contemplated that the security validation server may assist SSPs in preventing breaches in security implementations, and thereby provide a "peace of mind" for merchants. SSPs and vendors, e.g., Trust Wave, that do provide a portal for the filling up of the SAQ questionnaire process for merchants may have yet to simplify the process enough to aggregate the information of other third party SSPs of the merchant. In some embodiments, SSPs may be vetted before they can subscribe to systems and methods presented herein of providing simplified validation. It is contemplated that merchants would desire to use PCI compliant SSPs, as this would provide the merchants with the confidence in the security implementations and would facilitate the validation reduction using the methods described herein. Presently, merchants may use a variety of SSPs that offer PCI reduction. However, these SSPs (e.g., Trustwave) may only be reducing SAQs if they are asked or requested by the merchant, franchise, ISV or acquirer. This may cause unnecessarily repetitive work in the industry, e.g., when merchants use the same SSPs. Furthermore, these validation systems may not be manageable for the 200,000 merchants for which those acquirers process transactions. Various embodiments described in this present disclosure may provide for a validation system and method that can look at other third party technologies, e.g., P2P encryption, from a collection of SSPs to provide the best response for questionnaires and reports requested by PCI DSS. For example, while some of the platforms and systems used by merchants may not be validated as compliant by the PCI DSS, the platforms and systems may nevertheless be offering secure processing, giving the merchant scope reduction. It would be difficult for a merchant to explain this by itself through the questionnaires and reports requested by PCI DSS. Some embodiments of the present disclosure describe a validation system that keeps track of all the proprietary solutions, manage service providers (firewalls, etc.,) that merchants validation reduction. Thus, some embodiments provide a computing system that may keep track of all these information for the validation for a large number of merchants. It is contemplated that this information can be sold to or used by acquirers, integrated software vendors (ISVs), etc.

There may be tools, services, and/or products, e.g., offered by SSPs, already out there that may validate scope for a merchant. For example, some merchants (e.g., small to medium sized businesses) may need to complete a SAQ, run applicable vulnerability scans, and sign an Attestation of Compliance (AOC), in order to validate their PCI compliance. There may be nine versions of the SAQ, some with more questions than others, and possibly with repeat questions. A merchant may want to answer the least amount of questions possible, and still be able to utilize security implementation technologies (e.g., P2PE, managed firewalls, etc.). Various embodiments of present disclosure may eliminate the need for the merchant to answer a question and in turn offer "validation reduction." As PCI validation may be an industry requirement that merchants may be compelled to complete, validation reduction would greatly improve a merchant's ease in complying with PCI DSS. While there may be a number of types or categories for validating a scope of security in compliance with PCI DSS, there may not necessarily be one tool, service, and/or product in a solution that may meet all of those types or categories for validating the scope. For example, a merchant implementing P2P encryption and tokenization may satisfy some categories for security requirements but not other categories, and therefore result in only a partial validation reduction. In some embodiments, a merchant may not have the tools, services, and/or products that would help satisfy the other types or categories for validating scope, for example, because their acquirer may not adapt to or implement other necessary tools, services, products to satisfy the other security requirements. It is contemplated that there may be a level of agnosticism in front of these portals, and may certify directly with SSPs on how does its products, tools, and/or services meet scope requirements of the PCI DSS. There may be a level of aggregation that may be more agnostic toward a certain tool, product, or service, because an SSP may have other tools, products, or services to help achieve scope, and that may the missing component for a PCI DSS questionnaire or report. The security validation server may compile or list all of the tools, products, and/or services used by or provided to merchants by SSPs. There may be a level of aggregation at this hosted interface, to push down the requirements (e.g., of a PCI DSS) down to a portal, e.g., so that a merchant may know whether they meet scope requirements of the PCI DSS. For example, the portal of the security validation server may inform the merchant that it has met 100 of the 250 requirements of the PCI DSS because it subscribes to services A, B, C, and D provided by various SSPs.

As merchants (e.g., small or medium sized business) may often not understand the questions asked in the PCI DSS SAQs, and may not be interested in not having to do PCI DSS SAQs, these merchants may be involved in any tools, products, and/or services that may help the merchants achieve scope reduction. The security validation computing system or server, as will be described herein may meet at least some of the needs described.

One or more examples of these non-limiting embodiments are illustrated in the selected examples disclosed and described in detail with reference made to FIGS. 1, 2, 3A-3B, and 4A-4B in the accompanying drawings. Those of ordinary skill in the art will understand that systems and methods specifically described herein and illustrated in the accompanying drawings are non-limiting embodiments. The features illustrated or described in connection with one non-limiting embodiment may be combined with the features of other non-limiting embodiments. Such modifications and variations are intended to be included within the scope of the present disclosure.

FIG. 1 depicts a block diagram of an example environment for automated validation for proprietary security implementations, in accordance with non-limiting embodiments. At a high level, the environment comprises: various merchants 102 that are using one or more of the systems and methods described in the present disclosure for automated validation for security implementations; various security service providers (SSPs) 104 that may offer various tools, products, and/or services for security implementations, which may be used by the merchants 102; one or more server(s) or computing system(s) involved with the payment card industry data security standards (PCI DSS) ("PCI DSS Server(s)" 108; and a centralized computing system or server involved with automated security validation (e.g., "security validation server" 110). The various components described may be able to communicate with one another and/or relay information using the internet and/or cloud 106. The PCI DSS Server(s) 108 may store information or a repository of report(s) on compliance 108A or a questionnaire bank 108B. As known to those having ordinary skill in the art, while some merchants (e.g., Level 1 Visa merchants) may need to complete report(s) on compliance to validate their security implementations, other merchants may need to complete self-assessment questionnaires (SAQs). The questionnaire bank may be a repository of various questions and data fields to be completed by merchants that are asked to complete SAQs. In some embodiments, security validation server 110 may include various engines that receive information from various components of environment 100 periodically, continuously, or at set times. These engines may include, for example, SSP engine 110B receiving information related to the various tools, services, and/or products offered by the individual SSPs 104 and the merchant engine 110C receiving identifying information about the various merchants along with the SSPs that the merchants subscribe to. One or more of the SSP engine 110B or the merchant engine 110C may also receive information on the services, tools, and/or products that the each of the individual merchants may be using, has implemented, or the merchant's configuration or implementation settings of these services, tools, and/or products. The engines may further include PCI report and questionnaire engine 110D, which may receive information the various questionnaires, questions, individual data fields, or reports, issued by PCI DSS Server(s) 108 that is requested to be completed or answered by merchants 102. The various information gathered from the various engines described may be stored in repository 110A or processed, via one or more processors (e.g., processor 110E). Furthermore, a portal 110F of security validation server 110 may allow an interface for communication with various end users of the processed information (e.g., merchants 102, SSPs 104, PCI DSS server(s) 108, third parties, etc.).

Figure 2:
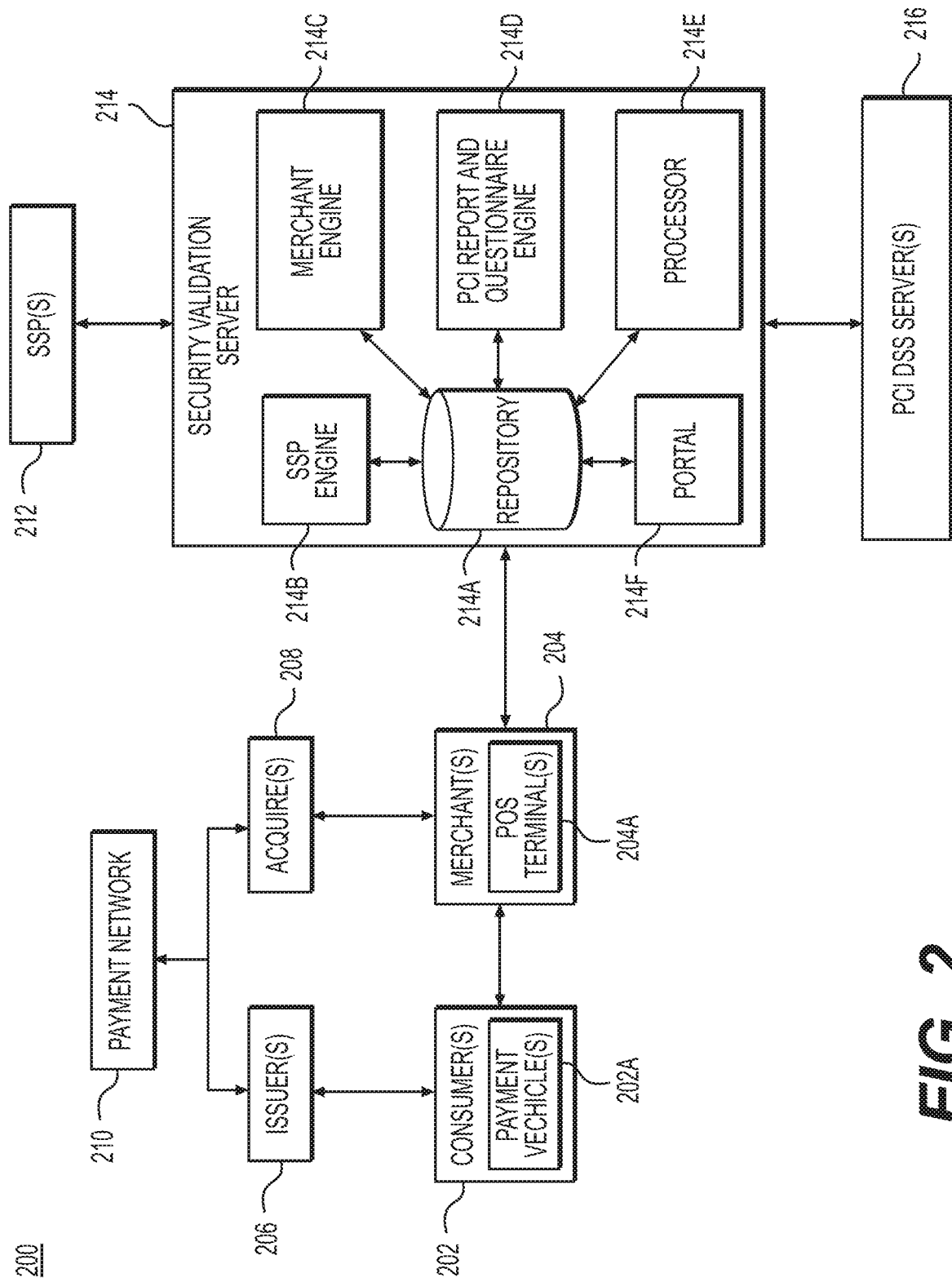
FIG. 2 depicts a block diagram of an example environment for automated validation for proprietary security implementation during payment transactions, in accordance with non-limiting embodiments.

FIG. 2 depicts a block diagram of an example environment 200 for automated validation for proprietary security implementation during payment transactions, in accordance with non-limiting embodiments. Various embodiments of the present disclosure may involve a consumer(s) 202 conducting payment transaction(s) with merchant(s) 204 using a payment vehicle 202A, e.g., a credit card, debit card, or the like. It will be appreciated by those of skill in the art that consumer 102 may present payment vehicle 202A at POS terminal 204A of merchant 204 to initiate a payment transaction. POS terminal 204A of merchant 204 may transmit transaction information to payment network 210 via a computing system or server of the merchant's acquiring financial institution (e.g., "acquirer(s)" 208). Payment network 210 may further transmit the transaction information back to a computing system or server of the issuer (e.g., "issuer(s)" 206) of the payment vehicle(s) 202A.

As shown in FIG. 2, payment vehicle 202A may be linked with a financial account of resources or funds defined by a primary account number ("PAN") and/or other cardholder details. A payment vehicle 202A may include a physical card including a plastic or metallic card having a magnetic stripe, bar code, or other device or indicia indicative of an account number or other account information, and/or a virtual card, such as a display or screen shot for a mobile phone or for another portable device, or for a computer device in combination with data indicative of an account number or other account indicative information. Data associated with payment vehicle 202A may include an encrypted or unencrypted account number or other encrypted or unencrypted account information and/or encrypted or unencrypted information associated with a particular consumer, issuer, acquirer, or merchant. Funds from the payment source accounts of the consumer(s) 202 may be applied to a given transaction according to methods known to those having ordinary skill in the art. It is contemplated that each of the parties and/or their computing systems involved in the payment transaction process (e.g., consumer(s) 202, merchant(s) 204, POS terminal(s) 204A, issuer(s) 206, acquirer(s) 208, payment network 210) may be involved in the transmittal or processing of sensitive information (e.g., cardholder data, consumer or merchant data, biometric information, etc.) Thus, in some embodiments, as depicted in FIG. 2, the security validation server 214 may be involved in gathering security implementation information of one or more of the parties and/or their computing systems described above. Thus, security validation server 214, may gather security implementation information of the one or more parties through its engines (e.g., merchant engine 214C), information regarding SSPs and/or their tools, services, and/or products pertaining to security via its SSP engine 214B, and compliance related reports and questionnaires via its PCP report and questionnaire engine 214D, and store the gathered information in its repository 214A.

Figure 4A:
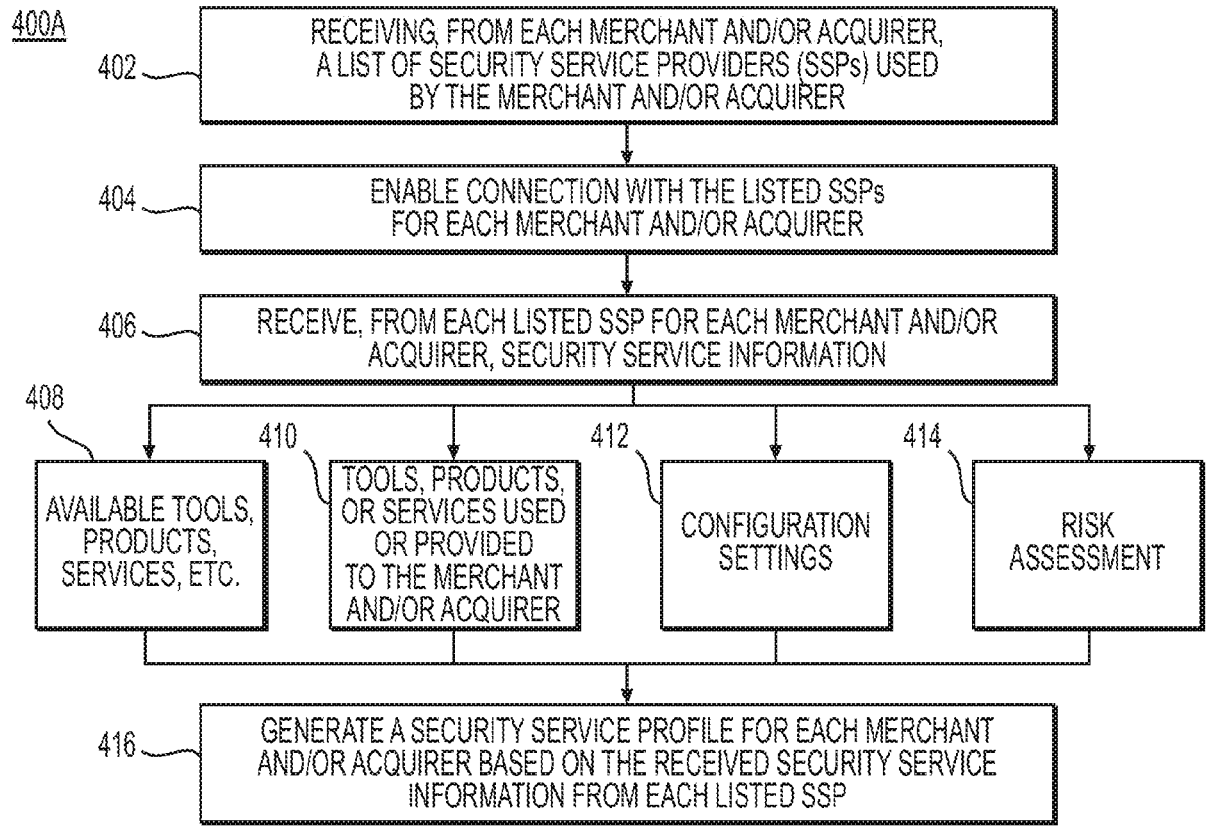
FIGS. 4A and 4B depict flow charts of example processes executed by a security validation server(s) or computing system(s), in accordance with non-limiting embodiments.
Figure 4B:
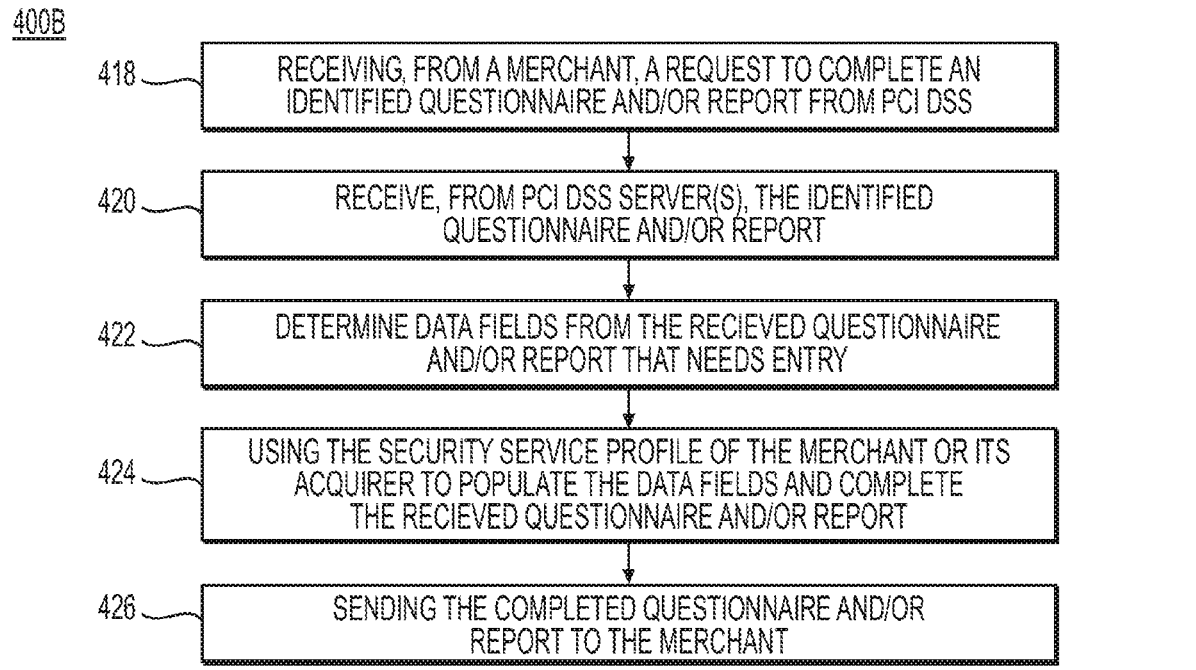

The portal 214F may allow the security validation server to communicate with one or more parties of the transaction, SSPs, or with PCI DSS Server(s) 216 (e.g., to submit completed reports or questionnaires regarding security validation of the one or more parties). Furthermore, it is contemplated that in some embodiments, based on the security standards and/or competences of one or more of the parties, the security validation server 214 may even interfere with the payment transaction process, e.g., to prevent an unsecured transaction from carrying through and/or to minimize the risk of exposing sensitive data as a result of insufficiently protected security implementations. Processor(s) 214E may assist in carrying forth one or more of the above described functions. FIGS. 4A and 4B may describe some of these functions in greater detail.

FIGS. 3A and 3B depict exemplary merchant and security service provider (SSP) engines, respectively, of the security validation server, in accordance with non-limiting embodiments. For example, FIG. 3A depicts a data structure of the merchant engine, which may provide the gathered data of the various merchants 302 that may subscribe to the system for automated validation for security implementations, described in various embodiments herein. The merchants may be identified, for example, via a merchant identifier. For each merchant, the merchant engine may list the various security service providers (SSPs) 304 it has subscribed to and/or which the merchant is currently using products, tools, and/or services from. For example, merchant 41238 may be using services provided by three SSPs — Trust Wave, ABC, and XYZ. As merchants subscribe or use additional SSPs, or remove the use or subscription to an SSP, the list in 304 may be altered. In some embodiments, one or more of the merchant identifier or the SSPs whose products, tools, and/or services it is using or is subscribed to may be encrypted, e.g., to protect vital information.

As shown in FIG. 3B, the SSP engine may provide the gathered data of the various SSPs 306 enlisted in the system for automated validation for security implementations, described in various embodiments herein. The SSPs may be identified, for example, via an SSP identifier. For each SSP, the SSP engine may list the various tools, services, and/or products 308 it offers or provides for security implementation. For example, the SSP, Trustwave may be offering the following security implementation products: web application firewall, SOC enablement, SIEM enterprise, and web content monitoring. It is contemplated that the implementation of an offered service, product, and/or tool by a merchant may allow the merchant to comply with or validate one or more security requirements or standards of the PCI DSS, and/or allow the filling up of certain data fields or questions of the questionnaires (e.g., SAQ) or reports (e.g., report on compliance) of the PCI DSS. In some embodiments, the list of tools, services, and/or products 308 may be those that are currently in use by the merchants of a system. In other embodiments, the list may be exhaustive of all the services, products, and/or tools offered by the SSP. Furthermore, the SSP engine may also provide an indication of any updates, add-ons, or versions of the displayed services, products, and/or tools offered by the SSP. In yet another embodiment, the SSP engine may also provide an indication of which merchants may already have subscribed to or is using the displayed services, products, and/or tools offered by the SSP, and/or which merchants still need to implement, download, or use a displayed service, product, and/or tool.

FIGS. 4A and 4B depict flow charts of example processes executed by a security validation server(s) or computing system(s), in accordance with non-limiting embodiments. It is contemplated that methods 400A and 400B, as depicted in FIGS. 4A and 4B, respectively, may be performed by computing system(s) or server(s) that may be configured for automated validation for security implementation (e.g., the security validation server in FIGS. 1 and 2).

Moreover, FIG. 4A may depict an exemplary embodiment for generating information pertaining to the security standards and processes used by a merchant ("security service profile"), which can be used, e.g., to suggest new tools, products, or services to the merchant to boost its security, or to fill-up important questionnaires (e.g., PCI DSS SAQ), reports ("Report on Compliance (ROC)"), or assessments provided by various sources or authorities for security standards (e.g., PCI DSS, personal identification number (PIN) transaction security requirements, payment application data security standard, etc.).

Referring to FIG. 4A, step 402 may include receiving, from each of a plurality of merchants and/or acquirers, a list of security service providers used by the merchant and/or acquirer. Step 404 may include enabling a connection with the each of the security service providers of the received list of security service providers used by the merchant and/or acquirer.

Step 406 may include receiving, from each of the listed security service provider with connection enabled, security service information as it pertains to the merchant and/or acquirer of the plurality of merchants and/or acquirers. These security service information may include, but are not limited to, e.g., available tools, products, or services offered by security service provider that increases data security when implemented by a merchant (e.g., as in 408), tools, products, or services offered by security service provider that is already being used being provided to the merchant (e.g., as in 410), configuration or implementation settings of the merchant for tools, products, or services offered by security service provider and implemented by the merchant (e.g., as in 412), data security risk assessment of the merchant based on tools, products or services produced by the security service provider and implemented by the merchant (e.g., "risk assessment" 414), etc.

Step 416 may include generating a security service profile for each merchant of the plurality of merchants, based on the received security service information from each security service provider of the received list of security service providers of the merchant. The generated security service profile for each of the merchants of the plurality of merchants may be outputted and stored to an electronic storage medium, e.g., for retrieval in method 400B of FIG. 4B. Alternatively or additionally, the generated security service profile may be presented to interested parties (e.g., merchants, acquirers, issuers, SSPs, etc.) or sold, for example, to integrated software vendors, e.g., for marketing security products and services. In some embodiments the security service profile may be an information database or record of the merchant's security settings and standards, which can be used by the security validation server, for example, to inform third parties (e.g., PCI DSS) of compliance, or fill up important questionnaires, reports, or assessments.

The security service profile may include, for example, a list of security service providers that a merchant may be using or is subscribed to; a list of tools, products, or services offered by the security service providers of the merchant, and/or implemented by the merchant; a list of system components owned or used by the merchant that store, process, or transmit cardholder data; an assessment of the extent to which the tools, products, or services implemented by the merchant meet data security standards of the system components owned or used by the merchant that store, process, or transmit cardholder data; etc. It is contemplated that system components owned or used by the merchant that store, process, or transmit cardholder data may include, e.g., network devices (both wired and wireless), servers, computing devices, applications, virtualization components (such as virtual machines), etc.

It is contemplated that in some embodiments, the SSPs themselves may provide a list of merchants that subscribe to the SSPs for security implementation along with the tools, products, or services of the SSPs that the merchants use, have access to, or have installed for security implementation. In such embodiments, SSPs may connect to the security validation server and provide a list of merchants using their PCI services, products, or tools. This may allow validation reduction for a merchant or acquirer to be done on their behalf, without the merchant or acquirer having to provide the security validation server with a list of SSPs used by the merchant and/or acquirer. Thereafter, the merchant or acquirer may be automatically presented with a "reduced SAQ" or "reduced ROC" using method 400B, as depicted in FIG. 4B, and as described further in the present disclosure.

Thus, as an alternative or as an addition to steps 402-406, such embodiments may include receiving, from each SSP, a plurality of merchants and/or acquirers that use, have access to, or have installed the SSP's tools, products, or services. Subsequently, the embodiments may include include receiving, from the SSPs, the security service information as it pertains to each of the listed merchants and/or acquirers of the that use the SSP. In one embodiment, the merchants may have to agree to terms with the SSPs that the merchants use for the SSPs to provide the security service information.

FIG. 4B depict method 400B of utilizing the security service profile of a merchant to fill-up questionnaires, assessments, or reports pertaining to the data security of a merchant. These questionnaires, assessments or reports may be produced or created by a valid source or authority for data security standards (e.g., (e.g., PCI DSS, personal identification number (PIN) transaction security requirements, payment application data security standard, etc.). Thus, method 400B is an example of at least on use of the security service profile generated in step 416 in method 400A.

Referring to FIG. 4B, step 418 may include receiving, from a merchant, a request to complete an identified questionnaire and/or report pertaining to data security standards of a merchant. The request may also merely be to partially complete the identified questionnaire and/or report. It is contemplated that the identified questionnaire or report is from an authority or source for data security standards (e.g., PCI DSS), who may use the questionnaire and/or report to monitor compliance.

Alternately or additionally, the security validations server may automatically identify a questionnaire and/or report that the merchant needs to complete, or partially complete. This may be true where the authority or source for the data security standards offers and requests the completion of different types of questionnaires and/or reports depending on the category of the merchant. For example, PCI DSS may request the completion of different SAQs, depending on whether the merchant belongs to a certain category. These categories for merchants may include, for example, card-not-present merchants that outsource cardholder data functions to third party service providers; E-commerce merchants who outsource cardholder data functions to third party service providers, and who have website(s) that do not directly receive cardholder data; merchants using imprint machines or standalone dial-out machines with no electronic cardholder data storage; merchants using only standalone, PTS-approved payment terminals with an IP connection to the payment processor with no electronic cardholder data storage; merchants having no electronic cardholder data storage, and who manually enter a single transaction at a time via a keyboard into an Internet-based, virtual payment terminal solution that is provided and hosted by a third-party service provider; merchants with payment application systems connected to the Internet, no electronic cardholder data storage; merchants using hardware payment terminals included in and managed via a point to point encryption solution, with no electronic cardholder data storage; merchants not included in the above described categories; and security service providers. Thus, in some embodiments, the SSPs may be considered as merchants.

Step 420 may include receiving from the source for the data security standards (e.g., the PCI DSS server(s)), the identified questionnaire, and/or report. It is contemplated that depending on the identified questionnaire, assessment, or report, other sources for data security standards may be contacted. Alternatively or additionally, the security validation server may continually or periodically store the latest questionnaires or reports, e.g., via an engine.

Step 422 may include determining data fields from the received questionnaire and/or report that needs entries. Step 422 may be performed using one or more processors that parse data to see which questions are unanswered or requires information, using, for example, text recognition.

Step 424 may include using the security service profile of the merchant or its acquirer to populate the data fields (determined in step 422) to complete the received questionnaire and/or report. Thus, step 424 may include retrieving, from the electronic storage medium, the security service profile of the merchant, e.g., as generated in step 416 of method 400A. It is contemplated that depending on preferences or settings, not all of the determined data fields need to be completed, for example, if a merchant has already started filling out a questionnaire. Furthermore, step 426 may include sending or transmitting a completed or partially completed questionnaire and/or report to the merchant. Alternatively or additionally, the completed or partially completed questionnaire and/or report may be submitted back to the source of the data security standards (e.g., PCI DSS).

In various embodiments, one or more of the illustrative components can be incorporated in, or otherwise form a portion of, another component. For example, the PCI DSS server(s) or computing system(s), or portions thereof, may be incorporated in the security validation server(s) or computing systems, and vice versa. In another example, the security validation server(s) or computing system(s) may be a part of or replace an acquirer of a merchant. In another example, a repository or storage device of one of the above described computing systems or servers may be incorporated within a data storage component, and may be referred to as an electronic storage medium. It is intended that the specification and examples be considered as exemplary only, with a true scope and spirit of the invention being indicated by the following claims.

What is claimed is:

1. A computer-implemented method of automated validation for proprietary security implementations, the method comprising:
receiving, by a centralized server, a first list of security service providers from a first merchant and a second list of security service providers from a second merchant, the first list of security service providers and the second list of security service providers received via a communication interface of the centralized server;
enabling, by a portal of the centralized server, a connection with the each of the security service providers of the received first list of security service providers and the received second list of security service providers via the communication interface;
receiving, by the centralized server, security service information from a security service provider with connection enabled, the security service provider with connection enabled listed on one of the first list of security service providers and the second list of security service providers, the received security service information pertaining to one of the first merchant and the second merchant;
generating, by a processor of the centralized server, a security service profile for a merchant of the first merchant and the second merchant that comprises an assessment of an extent to which the tools, products, or services implemented by one of the first merchant and the second merchant meets a payment cards industry data security standard (PCI DSS) of a list of system components owned or used by the merchant that store, process, or transmit cardholder data, based on the received security service information from the security service provider with connection enabled;
storing, by the processor of the centralized server, the security service profile of the merchant to an electronic storage medium;
interfering, by the processor of the centralized server, with a payment transaction process involving the merchant to prevent an unsecured transaction, based on the assessment of the security service profile of the merchant indicating that one or more of the tools, the products, or the services implemented by the merchant does not meet the PCI DSS of the list of system components owned or used by the merchant that store, process, or transmit the cardholder data; and
providing, by the processor of the centralized server, a portal allowing an interface for communication with various end users,
wherein the security service information comprises one or more of:
available tools, products, or services offered by the security service provider that increases data security when implemented by the merchant;
the tools, the products, or the services offered by the security service provider that are already being used being provided to the merchant;
configuration or implementation settings of the merchant for the tools, the products, or the services offered by security service provider and implemented by the merchant; and
data security risk assessment of the merchant based on the tools, the products or the services produced by the security service provider and implemented by the merchant.

2. The method of claim 1, further comprising,
identifying a questionnaire and/or report pertaining to the PCI DSS of the merchant, wherein the questionnaire and/or report is produced by a source for the data security standards;
receiving from the source for the PCI DSS, the identified questionnaire and/or report;
determining data fields from the received questionnaire and/or report that needs entries;
retrieving, from the electronic storage medium, the security service profile of the merchant;
populating at least some of the determined data fields of the received questionnaire and/or report using the retrieved security service profile of the merchant, to complete or partially complete the questionnaire and/or report; and transmitting a completed or partially completed questionnaire and/or report to one or more of the merchant or to the source of the PCI DSS.

3. The method of claim 1, wherein the security service profile for each merchant comprises one or more of:

the first list of security service providers of the first merchant;

the second list of security service providers of the second merchant;

a list of the tools, the products, or the services offered by the security service providers of and/or implemented by one of the first merchant and the second merchant;

the list of the system components owned or used by one of the first merchant and the second merchant that store, process, or transmit the cardholder data; and the assessment of an extent to which the tools, the products, or the services implemented by the one of the first merchant and the second merchant meets the PCI DSS of the list of system components owned or used by the merchant that store, process, or transmit the cardholder data.

4. The method of claim 2, further comprising, prior to identifying a questionnaire and/or report pertaining to the PCI DSS of the merchant, receiving a request, from the merchant to complete or partially complete the identified questionnaire and/or report pertaining to data security standards of a merchant.

5. The method of claim 2, wherein the identifying a questionnaire and/or report pertaining to the PCI DSS of the merchant is based on a category of one or more categories which the merchant belongs to, the one or more categories comprising one or more of:

card-not-present merchants that outsource cardholder data functions to third party service providers;

E-commerce merchants who outsource cardholder data functions to third party service providers, and who have website(s) that do not directly receive cardholder data;

merchants using imprint machines or standalone dial-out machines with no electronic cardholder data storage;

merchants using only standalone, PTS-approved payment terminals with an IP connection to a payment processor with no electronic cardholder data storage;

merchants having no electronic cardholder data storage, and who manually enter a single transaction at a time via a keyboard into an Internet-based, virtual payment terminal solution that is provided and hosted by a third-party service provider;

merchants with payment application systems connected to the Internet, no electronic cardholder data storage;

merchants using hardware payment terminals included in and managed via a point to point encryption solution, with no electronic cardholder data storage;

merchants not included in the one or more categories; and security service providers.

6. The method of claim 2, wherein:

the questionnaire includes a self assessment questionnaire (SAQ) provided by the PCI DSS; and the report includes the report on compliance (ROC) provided by the PCI DSS.

7. The method of claim 1, wherein the merchant is a security service provider.

8. A system for automated validation for proprietary security implementations, the system comprising:

a data storage device storing instructions for automated validation for proprietary security implementations; and a processor configured to execute the instructions to perform a method including:

receiving, by a centralized server, from each of a plurality of merchants, a first list of security service providers from used by the a first merchant and a second list of security service providers from a second merchant, the first list of security service providers and the second list of security service providers received via a communication interface of the centralized server;

enabling, by a portal of the centralized server, a connection with the each of the security service providers of the received first list of security service providers and the received second list of security service providers via the communication interface used by the merchant;

receiving, by the centralized server, security service information from each of the listed a security service provider with connection enabled, the security service provider with connection enabled listed on one of the first list of security service providers and the second list of security service providers, the received security service information as it pertains pertaining to one of the first merchant and the second merchant of the plurality of merchants;

generating, by a processor of the centralized server, a security service profile for each one of the first merchant and the second merchant of the plurality of merchants that comprises an assessment of an extent to which tools, products, or services implemented by one of the first merchant and the second merchant meets a payment cards industry data security standard (PCI DSS) of the list of system components owned or used by the merchant that store, process, or transmit cardholder data, based on the received security service information from each the security service provider with connection enabled of the received list of security service providers of the merchant;

storing, by the processor of the centralized server, the security service profile for each one of the first merchant and the second merchant of the plurality of merchants to an electronic storage medium; and interfering, by the centralized server, with a payment transaction process involving the merchant to prevent an unsecured transaction, based on the assessment of the security service profile of the merchant indicating that one or more of the tools, the products, or the services implemented by the merchant does not meet the PCI DSS of the list of system components owned or used by the merchant that store, process, or transmit the cardholder data, wherein the security service information comprises one or more of:

available tools, products, or services offered by the security service provider that increases data security when implemented by the merchant;

the tools, the products, or the services offered by the security service provider that are already being used being provided to the merchant;

configuration or implementation settings of the merchant for the tools, the products, or the services offered by security service provider and implemented by the merchant; and data security risk assessment of the merchant based on the tools, the products or the services produced by the security service provider and implemented by the merchant.

9. The system of claim 8, further comprising, the system components owned or used by each of a plurality of merchants that store, process, or transmit the cardholder data;

security service providers that offer the tools, the products, or the services to merchants to comply with the PCI DSS; and a source for the PCI DSS.

10. The system of claim 8, wherein the processor is further configured for:

identifying a questionnaire and/or report pertaining to the PCI DSS of a merchant of the plurality of merchants, wherein the questionnaire and/or report is produced by a source for the PCI DSS;

receiving from the source for the PCI DSS, the identified questionnaire and/or report;

determining data fields from the received questionnaire and/or report that needs entries;

retrieving, from the electronic storage medium, the security service profile of the merchant;

populating at least some of the determined data fields of the received questionnaire and/or report using the retrieved security service profile of the merchant, to complete or partially complete the questionnaire and/or report; and transmitting a completed or partially completed questionnaire and/or report to one or more of the merchant or to the source of the PCI DSS.

11. The system of claim 8, wherein the security service profile for a merchant of the first merchant and the second merchant comprises one or more of:

the list of security service providers of the merchant;

a list of the tools, the products, or the services offered by the security service providers of the merchant, and implemented by the merchant;

the list of system components owned or used by the merchant that store, process, or transmit the cardholder data; and the assessment of an extent to which the tools, the products, or the services implemented by the merchant meet the PCI DSS of the list of system components owned or used by the merchant that store, process, or transmit the cardholder data.

12. The system of claim 10, wherein the processor is further configured for, prior to identifying a questionnaire and/or report pertaining to the PCI DSS of a merchant of the first merchant and the second merchant, receiving a request, from a merchant to complete or partially complete the identified questionnaire and/or report pertaining to data security standards of a merchant.

13. The system of claim 10, wherein:

the questionnaire includes a self assessment questionnaire (SAQ) provided by the PCI DSS; and the report includes the report on compliance (ROC) provided by the PCI DSS.

14. The system of claim 8, wherein one or more of the first merchant and the second merchant is a security service provider.

15. A non-transitory machine-readable medium storing instructions that, when executed by a processor, cause the processor to perform a method for automated validation for proprietary security implementations, the method including:

receiving, by a centralized server, a first list of security service providers from a first merchant and a second list of security service providers from a second merchant, the first list of security service providers and the second list of security service providers received via a communication interface of the centralized server;

enabling, by a portal of the centralized server, a connection with the each of the security service providers of the received first list of security service providers and the received second list of security service providers via the communication interface used by the merchant;

receiving, by the centralized server, security service information from a security service provider with connection enabled, the security service provider with connection enabled listed on one of the first list of security service providers and the second list of security service providers, the received security service information pertaining to one of the first merchant and the second merchant;

generating, by a processor of the centralized server, a security service profile for a merchant of the first merchant and the second merchant that comprises an assessment of an extent to which tools, products, or services implemented by one of the first merchant and the second merchant meets a payment cards industry data security standard (PCI DSS) of the list of system components owned or used by the merchant that store, process, or transmit cardholder data, based on the received security service information from the security service provider with connection enabled;

storing, by the processor of the centralized server, the security service profile of the merchant to an electronic storage medium; and interfering, by the processor of the centralized server, with a payment transaction process involving the merchant to prevent an unsecured transaction, based on the assessment of the security service profile of the merchant indicating that one or more of the tools, the products, or the services implemented by the merchant does not meet the PCI DSS of the list of system components owned or used by the merchant that store, process, or transmit the cardholder data wherein the security service information comprises one or more of:

available tools, products, or services offered by the security service provider that increases data security when implemented by the merchant;

the tools, the products, or the services offered by the security service provider that are already being used being provided to the merchant;

configuration or implementation settings of the merchant for the tools, the products, or the services offered by security service provider and implemented by the merchant; and data security risk assessment of the merchant based on the tools, the products or the services produced by the security service provider and implemented by the merchant.

16. The non-transitory machine-readable medium of claim 15, further comprising, identifying a questionnaire and/or report pertaining to the PCI DSS of a merchant, wherein the questionnaire and/or report is produced by a source for the PCI DSS;

receiving from the source for the data security standards, the identified questionnaire and/or report;

determining data fields from the received questionnaire and/or report that needs entries;

retrieving, from the electronic storage medium, the security service profile of the merchant;

populating at least some of the determined data fields of the received questionnaire and/or report using the retrieved security service profile of the merchant, to complete or partially complete the questionnaire and/or report; and transmitting a completed or partially completed questionnaire and/or report to one or more of the merchant or to the source of the PCI DSS.

* * * * *